United States Patent
Gopal

(10) Patent No.: US 7,940,655 B2
(45) Date of Patent: May 10, 2011

(54) CROSS-LAYER OPTIMIZATION OF VOIP SERVICES IN ADVANCED WIRELESS NETWORKS

(75) Inventor: Thawatt Gopal, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 848 days.

(21) Appl. No.: 11/931,692

(22) Filed: Oct. 31, 2007

(65) Prior Publication Data

US 2009/0109893 A1 Apr. 30, 2009

(51) Int. Cl.
*H04L 12/26* (2006.01)

(52) U.S. Cl. ...................................... 370/229

(58) Field of Classification Search .......... 370/229–235, 370/310, 328, 464, 465, 468–474, 498; 709/229–231
See application file for complete search history.

(56) References Cited

U.S. PATENT DOCUMENTS

| | | | |
|---|---|---|---|
| 6,879,561 B1 * | 4/2005 | Zhang et al. | 370/235 |
| 7,164,919 B2 * | 1/2007 | Chen | 455/452.2 |
| 7,243,150 B2 * | 7/2007 | Sher et al. | 709/225 |
| 7,283,548 B2 * | 10/2007 | Denninghoff | 370/412 |
| 7,372,844 B2 | 5/2008 | Lee | |
| 7,474,627 B2 * | 1/2009 | Chheda et al. | 370/252 |
| 7,532,612 B2 * | 5/2009 | Lakaniemi et al. | 370/350 |
| 7,729,247 B2 * | 6/2010 | Kim et al. | 370/230 |
| 7,768,923 B2 * | 8/2010 | Kumar et al. | 370/235 |
| 7,796,516 B2 * | 9/2010 | Todd et al. | 370/232 |
| 2005/0226219 A1 * | 10/2005 | Casey et al. | 370/352 |
| 2006/0268713 A1 * | 11/2006 | Lundstrom | 370/235 |
| 2007/0019552 A1 * | 1/2007 | Senarath et al. | 370/235 |
| 2007/0189262 A1 | 8/2007 | Kim et al. | |

FOREIGN PATENT DOCUMENTS

| | | |
|---|---|---|
| CN | 1518300 A | 8/2004 |
| CN | 1756230 A | 4/2006 |

OTHER PUBLICATIONS

"One-way transmission time," Series G: Transmission Systems and Media, Digital Systems and Networks: International telephone connections and circuits—General Recommendations on the transmission quality for an entire international telephone connection, G.114, May 2003, 18 pages, ITU-T, Geneva, Switzerland.

PCT International Search Report of PCT/CN2008/071405, mailed Sep. 11, 2008, Applicant: Huawei Technologies Co., Ltd., et al., 6 pages.

* cited by examiner

*Primary Examiner* — Dmitry H Levitan

(74) *Attorney, Agent, or Firm* — Slater & Matsil, L.L.P.

(57) ABSTRACT

A cross-layer optimization is presented between the MAC and Network layers to enhance the performance of VoIP services in advanced wireless networks. Among the factors considered in the optimization are the characteristics of the originating source and the network path. This information is relayed using the Network layer to provide feedback to the MAC layer in order to improve the end-to-end performance of VoIP services.

25 Claims, 6 Drawing Sheets

CROSS-LAYER OPTIMIZATION OF VOIP SERVICES IN ADVANCED WIRELESS NETWORKS

TECHNICAL FIELD

The present invention relates, in general, to wireless communication systems, and, more particularly, to cross-layer optimization of voice over internet protocol (VoIP) services in advanced wireless networks.

BACKGROUND

The trend in third generation (3G), fourth generation (4G), and further advanced wireless networks is towards the all-IP network, which involves extending IP functionality and services into the radio access network (RAN) and the air-interface. Extending IP over the air-interface facilitates enhancements to client applications, devices, and end-user experience. Protocols have been developed and are being improved for providing IP services to wireless users and integrating the provisioning of IP to wireless users with the provisioning of IP to all other users, e.g., wireline, wireless local area networks (LAN), and the like. One such protocol is the IP multimedia subsystem (IMS). IMS is an architectural framework for delivering IP multimedia to mobile users based in part on session initiation protocol (SIP). Voice over IP (VoIP) is one of the key IP applications since voice still accounts for a significant percentage of the average revenue per user (ARPU) earned by most wireless operators.

VoIP services are real-time service applications. Because of the real-time nature of VoIP applications, the end-user is very sensitive to the end-to-end delay for the VoIP packets. This end-to-end delay directly affects a user's quality perception. To this end, the International Telecommunications Union (ITU) has sponsored guidelines and standards for improving the overall quality of telecommunications services. ITU G.114, for example, provides guidelines on what the end-to-end delay should be for VoIP services and also formulates methods to compute the quality of VoIP services. The end-to-end delay guidelines provided by ITU G.114 are then used to formulate the end-to-end delay criteria for VoIP for wireless networks.

Transmitting VoIP services over wireless networks creates new issues that have begun to be addressed. FIG. 1 is a block diagram illustrating a typical wireless network connecting two access terminals, ATs 100 and 106. In basic operation, the VoIP transmission originates at AT 100 and is received at base transceiver (BTS) 101. BTS 101 sends the VoIP transmission to the originating network control 102, which may comprises network components such as the base station controller (BSC), packet data service node (PDSN), and the like. After processing at originating network control 102, the VoIP transmission is transmitted over transmission network 103. Terminating network control 104 receives the VoIP transmission from transmission network 103 when the target receiver is within that network. When the location and address information is determined by terminating network control 104, the VoIP transmission is sent to BTS 105 for scheduling delivery to the target user, AT 106.

One of the key segments in this wireless communication process lies at the air interfaces, air interface 107 and 108. The air interface is the communication interface between the access terminal and the BTS. Wireless VoIP provides delay budgets for each interface in the wireless communication session from air interface 107, delay in originating network control 102, delay in transmission network 103, delay in terminating network control 104, and delay in air interface 108. There is a total cumulative delay maximum, in which, if the VoIP packet's cumulative delay exceeds that maximum, the packet is discarded instead of being delivered to the target user. Thus, great efforts are made to manage the end-to-end delay of VoIP transmissions over wireless networks.

For VoIP currently transmitted over wireless networks, robust header compression (ROHC) is typically used to compress the realtime protocol (RTP)/user datagram protocol (UDP)/IP headers for VoIP vocoded packets for capacity improvements over the air-interface. For mobile-to-mobile calls, there is a ROHC compressor at the originating mobile and there is a ROHC de-compressor at the originating RAN. The VoIP media packets from the source RAN will have uncompressed RTP/UDP/IP headers when sent from the originating to the terminating network.

From an end-to-end delay perspective, the mobile-to-mobile end-to-end VoIP media latency is the largest when compared to the mobile-to-land and land-to-mobile media latency. Here, "land" calls refer to the publicly switched telephone network (PSTN). There are several unknowns when choosing or determining media access control (MAC) parameters that affect the air-interface delay. One unknown is the loading at the source air-interface. For example, the target RAN, when receiving the VoIP packets, uses a certain delay bound or window that is calculated on a worst-case delay from the originating network. The worst-case delay is used because the target RAN does not know the cumulative delay experienced at the source RAN. Another unknown is the loading at the target air-interface. The delay margin or budget for VoIP media originating from the source network air-interface is chosen to reflect a fully loaded cell at the target RAN. Hence, the delay budget, to account for the air-interface delay at the source network, is set to a conservative value. Because of the conservative estimates used to account for these unknown parameters, a certain amount of inefficiency is built into mobile VoIP provisioning.

In VoIP services, because the VoIP users are sensitive to delay, the packet scheduler will typically throw away packets that are deemed too old. When implementing VoIP services over wireless networks as described above, because the worst-case delays are assumed when assigning delay budgets for the VoIP packets over the wireless interface, some of these packets may be discarded as being too old when, in fact, they are not. Thus, current networks that use these worst-case delay parameters may suffer in quality when perfectly valid packets are being discarded because the conservative estimate for delay pushes their age over the maximum allowable delay for that particular delay segment or hop.

SUMMARY OF THE INVENTION

These and other problems are generally solved or circumvented, and technical advantages are generally achieved, by preferred embodiments of the present invention which allows cross-layer optimization between the MAC and Network layers to enhance the performance of VoIP services in wireless networks. Among the factors considered in the optimization are the characteristics of the originating source and the network path. This information is relayed using the Network layer to provide feedback to the MAC layer in order to improve the end-to-end performance of VoIP services.

In accordance with a preferred embodiment of the present invention, a method for managing VoIP services that includes deriving one or more characteristics of an originating source VoIP transmission from a first communication device at an originating network, encoding the characteristics into VoIP transmission data, and transmitting the encoded VoIP transmission data to a second communication device at a terminating network, where at least one of the first and second communication devices are a wireless communication device.

In accordance with another preferred embodiment of the present invention, a communication system is made up from a first network node that includes a first processor and a detection component operable by the processor that examines one or more of a physical (PHY) layer or a media access control (MAC) layer of a VoIP packet for transmission characteristics. The VoIP packet is received from an originating communication device. The first network node also includes a first interface that transmits the VoIP packet and the transmission characteristics to a second network node. The second network node is made up of a second processor, an encoder operable by the processor that encodes the transmission characteristics into the VoIP packet, and an output interface that transmits the encoded VoIP packet onto a transmission network addressed to a terminating communication device, where at least one of the originating or terminating communication devices is a mobile communication device.

In accordance with another preferred embodiment of the present invention, a computer program product having a computer readable medium with computer program logic recorded thereon includes code for deriving one or more characteristics of an originating source VoIP transmission from a first communication device at an originating network, code for encoding the one or more characteristics into VoIP transmission data, and code for transmitting the encoded VoIP transmission data to a second communication device at a terminating network, where at least one of the first and second communication devices are a wireless communication device.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely IP services in EVDO networks and WiMAX networks. However, the invention may also be applied, however, to other wireless networks.

EVDO (Evolution-Data Optimized or Evolution-Data Only) is a telecommunications standard for the wireless transmission of data through radio signals, typically for broadband Internet access. In the forward link traffic, it uses time division multiple access (TDMA) multiplexing, while in the reverse link traffic, it uses code division multiple access (CDMA) multiplexing, as well as frequency division duplex (FDD) to maximize the amount of data transmitted. Unlike standard 2G networks, which are circuit based, EVDO is a packet based air interface. It is standardized by the 3rd Generation Partnership Project 2 (3GPP2) as part of the CDMA2000 family of standards and has been adopted by many mobile phone service providers around the world— particularly those previously employing CDMA networks, as opposed to Global System for Mobile Communication (GSM) networks.

Figure 1:
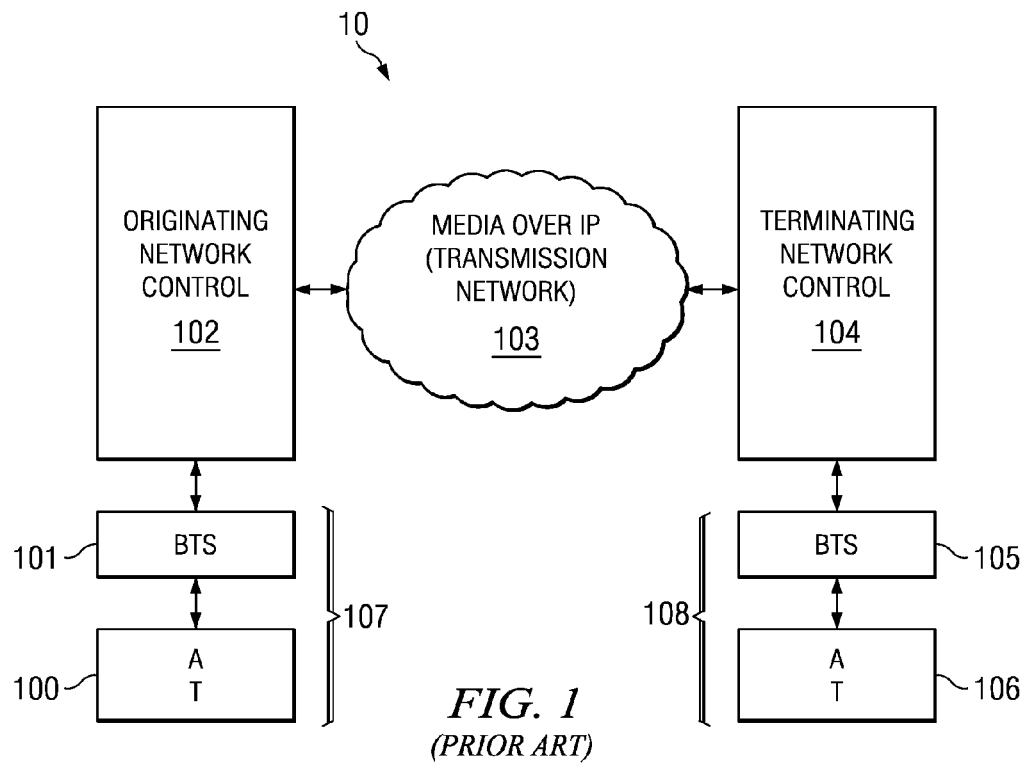
FIG. 1 is a block diagram illustrating a typical wireless network connecting two access terminals (ATs)
Figure 2:
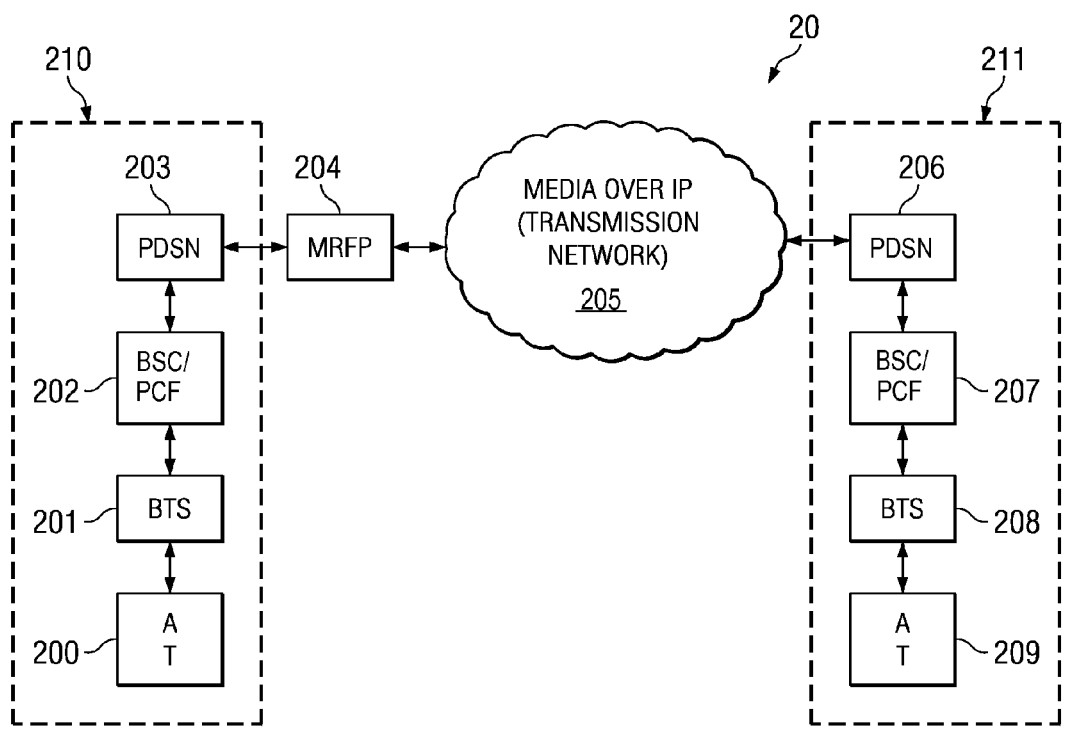
FIG. 2 is a block diagram illustrating a mobile-to-mobile (M2M) VoIP communication session shown over an EVDO network configured according to one embodiment of the present invention.

With reference now to FIG. 2, a mobile-to-mobile (M2M) IP communication session is shown over EVDO network 20 configured according to one embodiment of the present invention. In general operation, access terminal (AT) 200, intending to communicate with AT 209, establishes IP communication, which may be a VoIP service, with base transceiver station (BTS) 201. BTS 201 is controlled by and the packets transmitted from AT 200 are processed by base station controller (BSC)/packet control function (PCF) 202. The processed packets are then transmitted to packet data service node (PDSN) 203, where they are then forwarded to multimedia resource function processor (MRFP) 204 for processing onto transmission network 205. Transmission network 205 provides the transmitted media over IP. The first part of this transmission, from AT 200 to PDSN 203, comprises originating network 210.

Transmission network 205 delivers the transmitted data packets to PDSN 206. PDSN 206 processes the incoming packets and determines the access terminal they are addressed to. PDSN 206 then transmits the data packets to BSC/PCF 207 that controls BTS 208 in the communication vicinity of the target user, AT 209. The second part of this transmission, i.e., the delivery, from PDSN 206 to AT 209 comprises terminating network 211. The delay in M2M communication for the VoIP media plane is mostly due to the delay in the source air-interface, i.e., the interface between AT 200 and BTS 201, of originating network 210, the delay in the air-interface of terminating network 211, the packet delay through the RAN, and the packet delay through the transmission network, such as transmission network 205. The transmission network, such as transmission network 205, typically comprises one or more IP routers. The amount of delay attributable to the transmission network, will therefore depend on the bandwidth of the transmission network and the actual physical distance of the route traversed by the packets.

In prior systems, the terminating network did not have any idea of the delay involved in the originating network. Thus, as discussed above, conservative estimates of the delay were assumed when scheduling the packet delivery to the target user. VoIP capacity is measured based on the number of connections that meet the target mouth-to-ear delay. This measurement is typically the number of VoIP connections corresponding to the $95^{th}$ percentile meeting this target delay. Thus, because fewer connections will fall into this $95^{th}$ percentile when delay is based on a worst-case scenario, the overall VoIP capacity goes down.

Due to mobility, either of ATs 200 and/or 209 will travel through BTS that have different levels of loading (e.g. low, medium, and high). The distribution of loading at BTS, such as BTS 201, depends on the network deployment, geographical area, time of day, and the like. Since there are many variables that affect the distribution of loading, some real-time relaying of information about the source network delay to the target RAN, i.e., terminating network 211, will help optimize the scheduling of IP media packets at the target RAN. When the media packets arrive at the target RAN, terminating network 211 will have an estimate of the actual delay the IP media packets have actually experienced from the source or originating network 210 when the media packet arrives at terminating network 211. This is a significantly different approach to existing methods. This use of a more accurate estimate of the actual delay will also improve the voice quality of the VoIP session.

For example, in current systems, when two VoIP packets from different originating networks arrive at the same time at the terminating BTS, the same timestamp will be assigned to both packets and both packets will be scheduled to be sent over the air interface within the same absolute delay margin. In contrast, when the actual or estimate of the actual delay is used, the system is able to more accurately schedule the packets within the absolute delay margin, such that some packets which would previously had been discarded may now be scheduled and still meet the end-to-end VoIP media delay target for satisfactory VoIP quality.

IP networks operate under sets of protocols that determine how data, communications, and applications are configured. Applications are written using these protocols in order to comply with the transport mechanisms of the IP networks. Currently, the majority of IP networks operate under version four of these protocols, IPv4. In order to accommodate increasing bandwidth, provide larger IP address space, and provision transmission of multimedia data, version six, IPv6, was developed. While there are some networks that currently operate using IPv6, the migration from IPv4 is proceeding at a relatively slow pace. Because these two protocols co-exist in operation, and each is substantially different from the other, the present invention will be address from the implementation aspect for each version. Thus, the various embodiments of the present invention may apply to several different IP protocols.

Many applications are still defaulting to IPv4. Therefore, the various embodiments of the present invention may be used for a long time. Moreover, if a particular mobile application does support IPv6, the home network can still request the use of IPv4 during session negotiation/setup in order to take advantage of the optimization described here. Note that the use of IPv4 at the mobile application does not mean the IP RAN and transport network cannot use IPv6 since the IP layer for the example embodiment of the present invention is used at the mobile's application layer. In contrast, the IP layer at the RAN or Core Network transport is used for tunneling the mobile's VoIP application packets.

Figure 3:
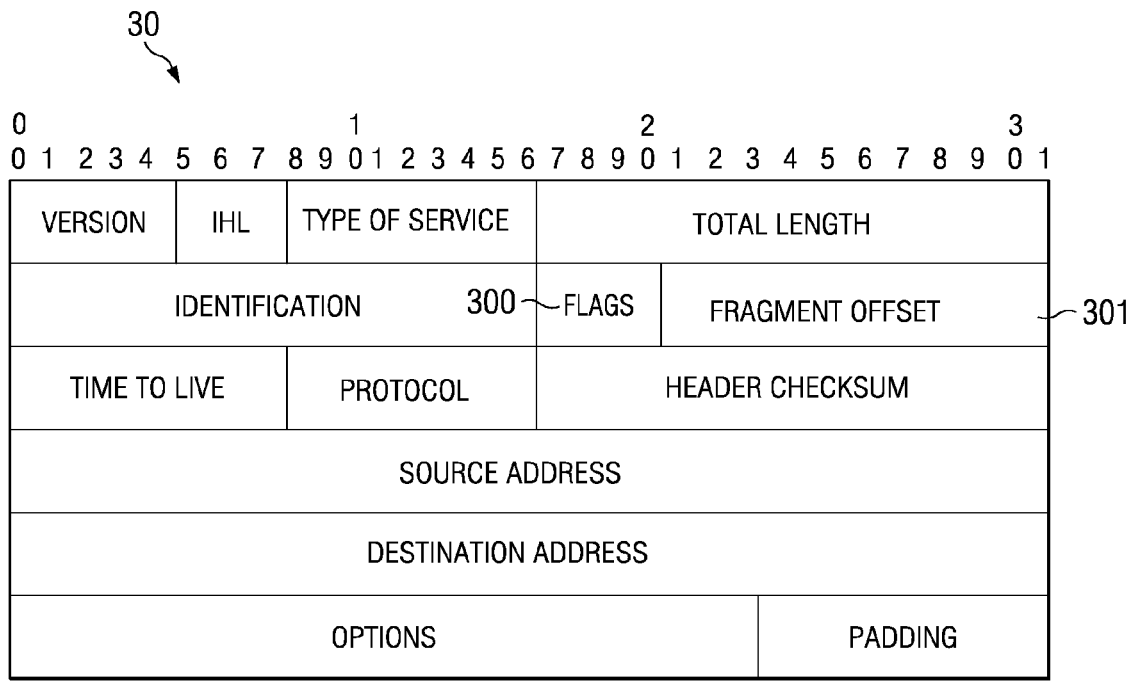
FIG. 3 is a diagram illustrating the format of an IPv4 header.

FIG. 3 is a diagram illustrating the format of IPv4 header 30. VoIP packets are relatively small packets. Therefore, VoIP packets typically do not require fragmentation. IP fragmentation is usually required when dealing with very large packet sizes. For the enhanced variable rate codec (EVRC) VoIP packet, the RTP/UDP header size is 20 bytes and the maximum EVRC vocoder frame size is the full-rate frame at 22 bytes. Thus, there is no need for IP fragmentation when dealing with IP applications, such as VoIP. Even wideband vocoders that are used on the internet, such as Yahoo!, Inc.'s YAHOO! VOICE™, Skype Ltd.'s SKYPE™, the like, do not require fragmentation as the packet size is still relatively small because the application is real-time voice.

The method of the currently-described embodiment of the present invention takes advantage of the unused fragmentation fields in the IPv4 header of the VoIP packet. There are 3-bits in Flags field 300. These bits represent Reserved (R), Don't Fragment (DF), and More Fragment (MF). When the DF bit is set to '1' ('1' means don't fragment), the routers processing the packets are not allowed to fragment the packet. The routers will also ignore Fragment Offset field 301, when 'DF' is set to '1.' Because DF=1 means "don't fragment," the remaining bits in Flags field 300, namely the 'R' and 'MF' bits and Fragment Offset field 301 are currently all set to '0s.'

In the described embodiment of the present invention, instead of automatically setting the 13-bit Fragment Offset field 301 to '0 0000 0000 0000' when DF is set to '1,' feedback with regard to the delay in the originating network is placed in Fragment Offset field 301. Because the routers will ignore this field when DF is set to '1,' the added information will not interfere with the normal operation of the routers. PDSN or RAN configured according to the present invention will process the data in Fragment Offset field 301 to determine the actual delay or packet transmission time of that particular data packet.

It should be noted that in various additional and/or alternative embodiments of the present invention, when Fragment Offset field 301 is set to '0 0000 0000 0000' and DF is set to '1,' the PDSN or RAN configured according to the present invention knows there is no feedback from the source network. However, when both Fragment Offset field and DF are non-zero, there is feedback and further processing can take place to recover information about the delay from the source network.

It should also be noted that the mechanism proposed herein would work well with the procedures for ROHC, because ROHC compresses/de-compresses the RTP/UDP/IP headers. This would involve an additional but not complicated task to inspect and translate the data in Fragment Offset field 301.

In EVDO Rev. A systems, a BTS will have knowledge of when the VoIP packet was transmitted based on the hybrid-automated request (H-ARQ) termination due to the H-ARQ operation and the timing and synchronization information referenced to a global synchronized clock, such as the global positioning system (GPS). This information is then relayed to the entity that performs the ROHC de-compression. This entity can be either at the BSC or the PDSN depending on the particular implementation. In a preferred embodiment, ROHC may be implemented at the BSC because the Abis interface, which allows control of the radio equipment and radio frequency allocation in the BTS in cdma2000, is non-standardized and may easily be modified to include additional information elements (IE) to carry this information to the ROHC de-compressor at the BSC. Messages are exchanged between the BSC and the BTS using the Abis interface. Each message contains several IEs, which may be grouped together according to its relationship to other pieces of information. If ROHC is terminated at the PDSN some modification to the existing A10/A11 interface standards may be needed to introduce a new IE to transport the time origin information. However, if the A10/A11 interfaces are using IPv4, it may also be possible to include the time of origin information in the A10/A11 IPv4 headers. The A10-A11 interface layer is typically used to tunnel the VoIP application layer packet.

Selected embodiments of the present invention may use GPS timing as the time reference. Because there are 13 bits available in fragment offset field 301, the GPS timing may be split into two or more sections to represent the specific time that the packet is transmitted from the originating network. In one example embodiment, 6-bits may be used to represent the GPS whole seconds time, while the remaining 7-bits may be used to represent the GPS partial seconds in $1/128$ seconds increments. Some modulo operations may be used to derive the 6-bit GPS Seconds time and 7-bits GPS $1/128$ second time from GPS time. Modulo operations are used to fit the GPS time information into the 13-bit IPv4 fragment offset field.

It should be noted that while GPS time is used in the preceding description, additional and/or alternative embodiments of the present invention may use universal coordinated time (UTC), sequential timing, or the like.

It should further be noted that in additional and/or alternative embodiments of the present invention, the method of synchronization between the originating network and the terminating network shall be the same. For example, if the originating network uses GPS for timing and synchronization, the terminating network will also use GPS in order to be consistent.

Referring back to FIG. 2, as AT 200 sends an IP packet, such as a VoIP packet, to BTS 201, BTS 201 determines an estimate of the VoIP transmit time from AT 200 by examining the PHY and MAC layers. BTS 201 then timestamps the VoIP packet with this time estimate and sends the VoIP packet on to BSC/PCF 202. For purposes of this example, ROHC de-compression occurs at BSC/PCF 202, thus, BSC/PCF 202 formats the timestamp and encodes the IPv4 header fragment offset field 301 (FIG. 3) with the origin time information.

At terminating network 211, the node that performs the ROHC compression at the terminating network is suitable for retrieving the time of origin information before compressing the RTP/UDP/IP headers for VoIP. In contrast to the existing networks, which estimate delay from originating network 210 by using worst-case estimates, or uses a timestamp corresponding to the time that the VoIP packet arrived at the terminating network PDSN, the timing information in various embodiments of the present invention are derived from the MAC/PHY layer at source BTS 201, and this information is relayed to terminating network 211 using the network layer via the IPv4 header fragment offset field 301 (FIG. 3). Thus, the air-interface scheduler at terminating network 211 can optimize the scheduling of VoIP packets using knowledge of the actual time that the packet was generated at originating network 210 and the target maximum end-to-end delay for VoIP services.

Figure 4:
FIG. 4 is a timing diagram illustrating transmission and reception times for VoIP packets transmitted in a mobile network configured according to one embodiment of the present invention.

FIG. 4 is a timing diagram illustrating transmission and reception times for VoIP packets transmitted in a mobile network configured according to one embodiment of the present invention. T1 represents the time that a VoIP packet was sent at the originating mobile device. T2 represents the time that the VoIP packet was received at the originating network BTS. T3 represents the time that the VoIP packet was received at the terminating network PSDN. T4 represents the time that the VoIP packet was received at the terminating mobile device. In the mobile network configured according to one embodiment of the present invention, the originating network BTS examines the PHY and MAC layers of the received VoIP packet to determine the mobile device transmission time of the VoIP packet (i.e., the time of origin). It then transmits this time of origin information to the component responsible for the ROHC de-compression, which could be either the BSC or PSDN. This ROHC de-compression component then encodes this information into the IPv4 header and sends the VoIP packet on. The scheduler at the terminating network BTS may then schedule packets using the time difference (T4-T1) based on the time of origin information that is retrieved from the IPv4 header. This provides more accuracy to the terminating network BTS. In contrast, existing networks can only use the difference (T4−T3) along with the worst-case-based end-to-end VoIP budget delay.

It should also be noted that, this method allows using the differential path delays from the source network to the terminating network. For example, two VoIP packets can arrive at the same time from different users in different geographical areas with different cumulative delays from their respecting originating network. Existing networks will put the same timestamp, which represents the time the terminating network receives the two VoIP packets, on the two VoIP packets, thus, ignoring the differential path delays from different originations to the same BTS. The various embodiments of the present invention help improve both VoIP voice quality and capacity by providing the opportunity to use time estimates that are closer to the actual originating device transmission times. The amount of this improvement will depend on the differential delays from the originating users which are influenced by the air-interface, RAN and transmission network delays.

Another key benefit of the currently-described embodiment of the present invention is that this method provides real-time information on a per VoIP packet basis, there is no overhead in terms of extra signaling or bandwidth expansion and requires low amount of processing.

Embodiments of the present invention may also be implemented in networks and mobile terminals using IPv6. Because of the great differences in the IPv6 header configuration, the various embodiments of the present invention implemented in IPv6 will use the realtime control protocol (RTCP) to carry an application (APP) RTCP packet that contains the time when the VoIP packet was sent from the originating VoIP mobile in the originating network. In using the RTCP protocol, nodes at the originating network are tasked with generating the RTCP packets for each VoIP connection. These nodes also correlate the transmission origin time with a realtime protocol (RTP) sequence number of the particular VoIP packet. The rate of RTCP packet generation by these nodes may be scalable and load dependent (i.e., dynamic rate adjustment). At the terminating network, the origin time will be extracted from the RTCP packets and used for scheduling.

It should be noted that in additional and/or alternative embodiments of the present invention, the RTCP rate may be configurable (i.e., static rate), which means that the rate is based on a configurable parameter that is set by the operator.

One disadvantage of using RTCP is that an RTCP message cannot be sent for every VoIP packet because of the bandwidth consumed by RTCP. Therefore, some form of periodic transmission is used. Because the RTCP message is sent periodically, the time of origin can be represented by either the actual time of origin or some adjustments to account for the periodic status.

Figure 5:
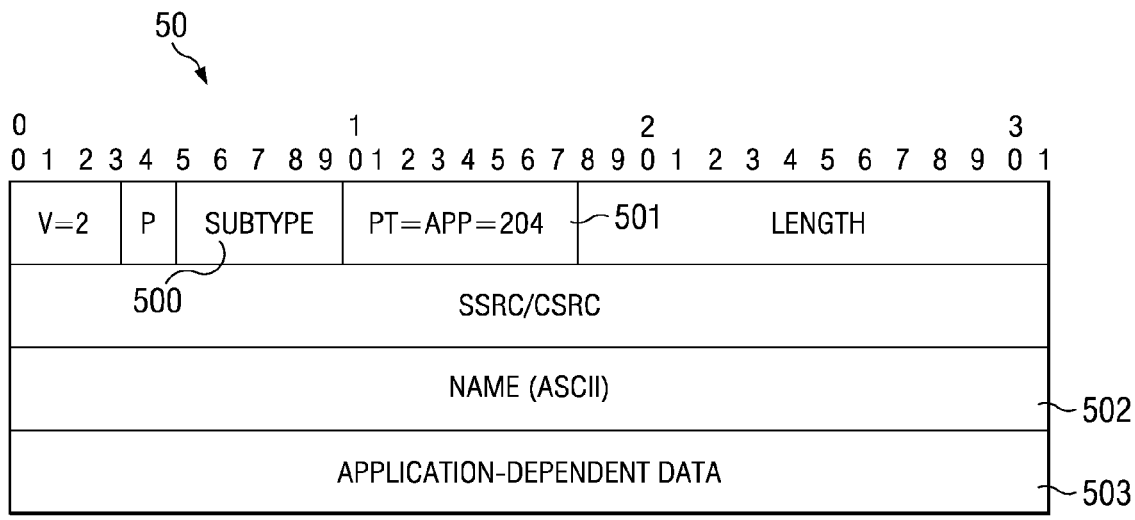
FIG. 5 is a diagram illustrating the format of an APP RTCP packet used in an IPv6 mobile network configured according to one embodiment of the present invention.

FIG. 5 is a diagram illustrating the format of APP RTCP packet 50 used in an IPv6 mobile network configured according to one embodiment of the present invention. Subtype field 500 is a 5-bit field that may be used to indicate different subtypes in future use. PT field 501 is the packet-type indicator. PT field 501 is set to a value of 204 for APP RTCP packets. Name field 502 provides four ASCII characters that may be set to name the particular packet. In order to facilitate use with the various embodiments of the present invention, a specific name may be assigned to all packets that carry compatible timing information. Application-dependent data field 503 provides the data field for the data payload. Application-dependent data field 503 should be written in multiples of 32-bits length. In implementing the present embodiment, the RTP sequence number and time of origin are both encoded into application-dependent data field 503.

In order to make use of APP RTCP packet 50, the RTP sequence number and time of origin will be configured to accommodate the parameters of application-dependent data field 503. The RTP sequence number is 16-bits in length. Therefore, the time of origin can be configured using GPS time. 32-bits are used to represent the whole-second GPS time resolution and 16-bits for the partial time value in units of $\frac{1}{65536}$ second. The GPS time values would be calculated using one or more modulo functions. Therefore, the total packet size for APP RTCP packet 50 is 160 bits. UDP/IP for IPv6 is 60 bytes. Thus, there will be a total of 640 bits for RTCP/UDP/IP for this purpose.

Figure 6:
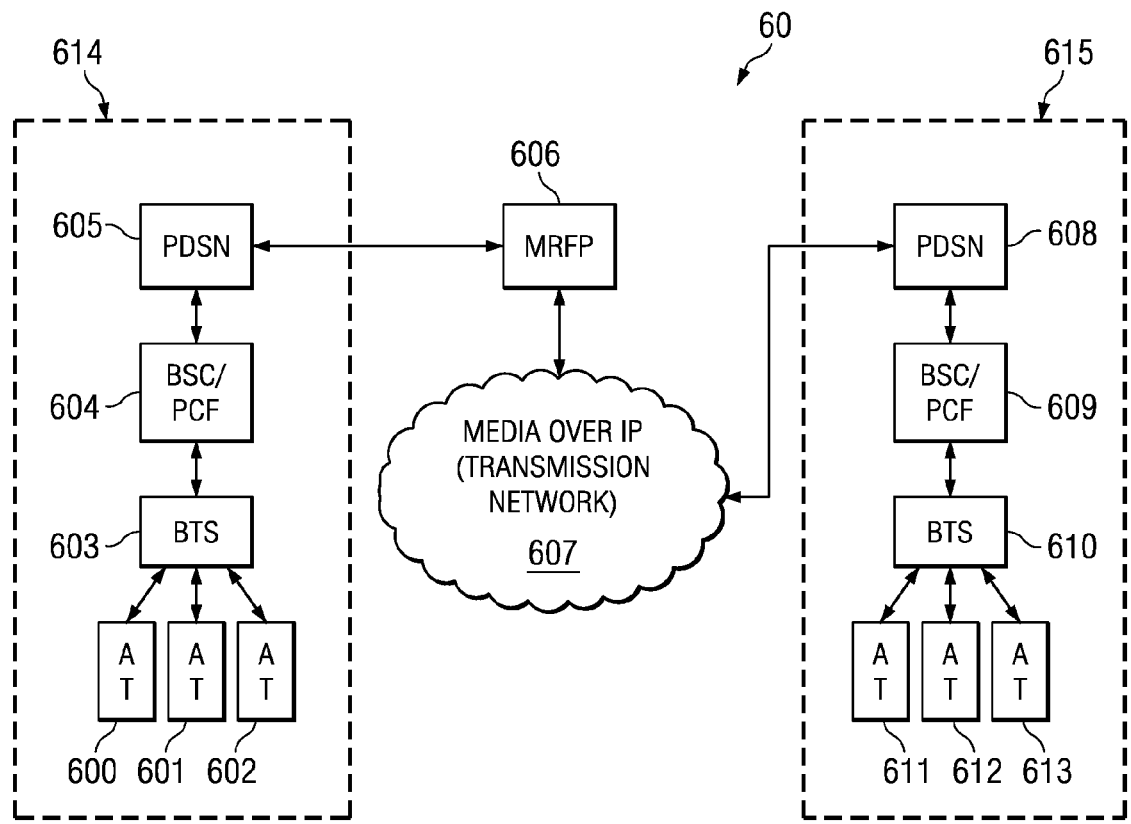
FIG. 6 is a block diagram illustrating an M2M IP communication session over an EVDO network configured according to one embodiment of the present invention.

FIG. 6 is a block diagram illustrating an M2M IP communication session over EVDO network 60 configured according to one embodiment of the present invention. ATs 600-602 establish communication with BTS 603 in order to begin IP transmission, such as with VoIP services. BTS 603 receives the VoIP packets and estimates the transmission time from the originating mobile device. This estimate is then transmitted on to BSC/PCF 604. BSC/PCF 604 performs the ROHC de-compression and generates the APP RTCP packet per VoIP connection and sending the APP RTCP packet on to PDSN 605. PDSN 605 sends the APP RTCP packet to multimedia resource function processor (MRFP) 606. The APP RTCP packet is then placed onto transmission network 607 to be transmitted to terminating network 615, where it is received by PDSN 608. PDSN 608 sends the APP RTCP packet to BSC/PCF 609 for ROHC compression and termination of the APP RTCP packet per VoIP connection. BSC/PCF 609 extracts and retrieves the encoded RTP sequence number and time of origin from the APP RTCP packet. This information is used by the scheduler in BTS 610 in scheduling the particular VoIP packet to be delivered to the terminating device, such as ATs 611-613.

In terms of implementation, the node that does the ROHC de-compression at originating network 614 is suitable to perform this processing of the VoIP packet because it has access to the RTP and IP information due to the requirements for ROHC processing.

In order to address the scalability of the example embodiment, upper and lower thresholds are defined for the APP RTCP report periodicity (i.e., the interval between APP RTCP reports) per VoIP connection. The transmission of APP RTCP reports are also uniformly transmitted in pre-defined intervals to shape the traffic and reduce bandwidth requirements. Also, fewer VoIP connections combined with more frequent APP RTCP reports increases the scalability of the example embodiment. In the implementation of the presently described embodiment, the target is, therefore, to send APP RTCP reports every 100 msec to 200 msec.

It should be noted that in additional and/or alternative embodiments of the present invention, the APP RTCP reports may be sent more frequently than every 100 ms when bandwidth constraints are not an issue. For example, when 10 gigabit Ethernet (10 GbE) is used in the transmission network.

For example, BSC/PCF 609 is the node that terminates ROHC in the presently described embodiment. Assuming there are 100,000 VoIP active connections, if transmission of APP RTCP packets is uniformly spaced every 1 ms, then there would be an approximate 64,000 bits/sec average bandwidth necessary per BSC for sending the APP RTCP packets whereby the frequency of sending the RTCP packet per VoIP connection is 1 APP RTCP/second. If the frequency of APP RTCP packets is increased to 100 msec per VoIP connection, the average bandwidth increases to 640,000 bits/sec assuming traffic shaping of RTCP packet transmission. Based on these estimated calculations, the target should be to send the APP RTCP packet every 100 msec to 200 msec. This rate should not be a problem with the use of gigabit Ethernet (GbE) for IP transport.

For terminating network 615, the APP RTCP packets are terminated at the node that performs the ROHC compression (e.g., PDSN 608 and BSC/PCF 609). The RTP sequence number and time of origin value are retrieved by this node from the APP RTCP packet where the time of origin is used to associate with the VoIP packet based on the RTP sequence number. Terminating BTS 610 schedules the VoIP packet based on this time of origin information. The terminating network may derive some additional time information taking into account the jitter of the APP RTCP packets and the history of delay distribution based on some filtering done at terminating network 615.

The greatest delay for VoIP communications occurs in the M2M scenario. This is because the delay from the air-interface exists on both the originating and terminating networks. However, various embodiments of the present invention may also be used in mobile-to-land (M2L) or land-to-mobile (L2M) communication session. In these sessions, however, the resultant delay is much less because the delay in land-based, wireline communication networks is much less.

Figure 7:
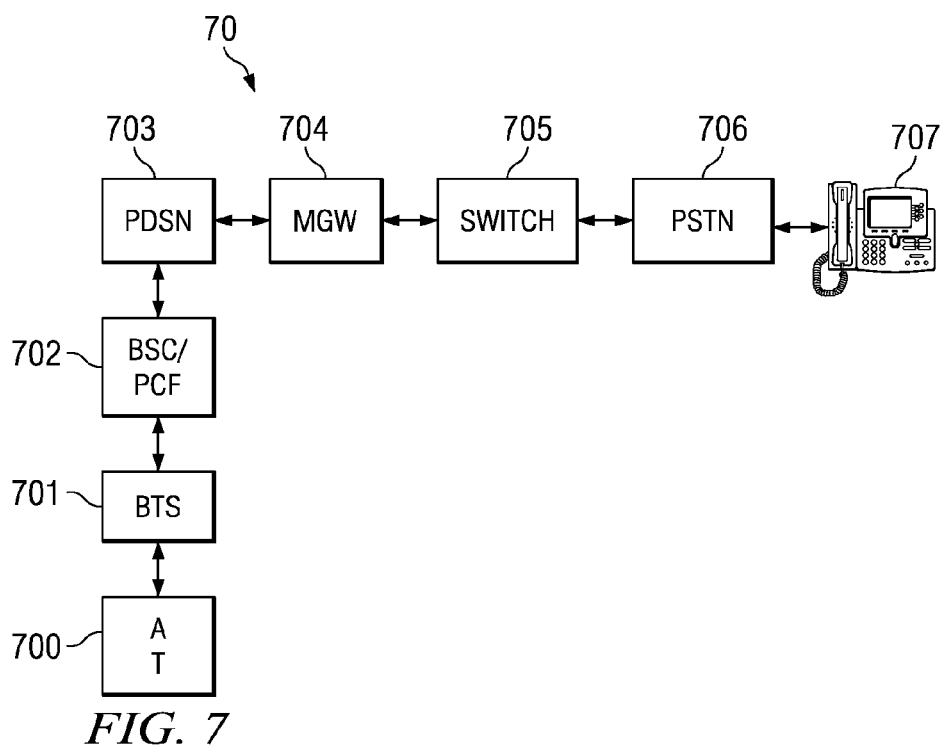
FIG. 7 is a block diagram illustrating mobile-to-land (M2L)/land-to-mobile(L2M) VoIP communication session shown over a communication network configured according to one embodiment of the present invention.

FIG. 7 is a block diagram illustrating communication network 70 configured according to one embodiment of the present invention. In a first optional implementation for M2L VoIP calls, the ROHC de-compressor (either at BSC/PCF 702 or PDSN 703) will de-compress the compressed RTP/UDP/IP headers. Since the VoIP media packet is to be routed to media gateway (MGW) 704 to inter-work with PSTN 706 through switch 705, this call-type information can be obtained from the IP address from the VoIP packet. This would also require the VoIP SIP session to be setup first. The call-type data would then be sent to BSC/PCF 702 for encoding into the VoIP data packet.

Upon detection that the VoIP packet is to be routed to PSTN 706 via switch 705 and MGW 704, the RAN can provide feedback to the module that control radio resources, radio resource manager (RRM) (not shown). For implementation, terminating ROHC at a BSC, such as BSC/PCF 702, would benefit this method of optimization because the ROHC de/compression module can provide feedback to the RRM in BSC/PCF 702. If, however, ROHC is terminated in PDSN 703, the feedback would be sent via the A10/A11 interfaces, as discussed previously. For EVDO networks, this would trigger an update such that the RAN could update MAC parameters to allow more delay over the air-interface reverse-link. This would involve EVDO air-interface signaling to change the H-ARQ termination target. The entire procedure of the presently-described embodiment of the present invention should be completed in between 500 msec to 1000 msec. For example, in EVDO Rev. A, the H-ARQ termination target can be updated to 4 sub-frames instead of 3 sub-frames on the reverse link. Currently, VoIP in EVDO uses 3-sub-frames as target for H-ARQ termination. This update would help increase reverse link capacity, whereby actual percentage of capacity increase would depend on the percentage of VoIP calls that are M2L in that sector.

In a second optional implementation, the SIP Invite message would be analyzed. In this method, the SIP Proxy (e.g., proxy-call session control function (P-CSCF) in IMS) provides feedback to the RAN RRM module based on analyzing the SIP Invite message. The terminating party information is provided in the SIP Invite message where for PSTN 706, this information is typically an E.164 number. E.164 is an ITU-T recommendation which defines the international public telecommunication numbering plan used in the PSTN and some other data networks. It also defines the format of telephone numbers. Therefore, if an E.164 number is detected, the system would know that terminating party 707 is on PSTN 706. The SIP Proxy (e.g., P-CSCF) would also provide information to the RRM at the RAN that this call (referenced to a VoIP Mobile ID) will be routed to PSTN 706. The feedback could either be in the form of a proprietary message, because there is currently no such standardized message, or a standardized message if standards are changed to account for this type of information.

This second optional implementation is more complicated but would be faster for the RAN to detect that this VoIP call is to be routed to PSTN 706, hence the RAN can update the RTC MAC parameters sooner. Time savings (in terms of detecting this call is VoIP M2L) from using this method is expected to be in order of several seconds since the SIP session setup is completed before the VoIP media can be transmitted. This actual time savings creates a time savings in the optimization of the MAC parameters for the reverse link (in M2L calls), which may be utilized sooner than the previous option that inspected the IP address of each of the VoIP media packets.

In the M2L/L2M scenarios, there is a tradeoff that can be made that yields more delay for more capacity without significant impact to voice quality since an M2L/L2M call end-to-end media delay is about 200 msec for EVDO Rev. A. More delay may be introduced through feedback from the network layer to the MAC Layer and gain experienced in the air-interface capacity, while still remaining within the ITU G.114 end-to-end delay recommendation of 285 msec for VoIP.

The L2M session process is much the same as the M2L, except in reverse. Because the land-based delay is much smaller, more delay can be accounted for in the air-interface of the down link communication in order to achieve greater capacity without sacrificing voice quality. In an L2M session using the first optional implementation as described above, the call-type information is obtained from the network layer. For example, the forward link scheduler can allow a longer delay bound for scheduling VoIP packets that are identified as L2M. This value can be 30-40 msec longer than the delay bound for VoIP Mobile-to-Mobile calls, while still providing voice quality equivalent to M2M calls with the benefit of an increase in the air-interface VoIP capacity. This call-type identification information can be provided via the user-plane message that carries the VoIP data on the Abis interface by introducing a new IE or field in the Abis user plane message from BSC to BTS.

The various embodiments of the present invention are not limited to only the current 3G, EVDO, or the like systems. Embodiments of the present invention may also be applicable to 4G networks, such as WiMax networks. 4G networks still deal with the dual IP protocols of IPv4 and IPv6 and the slow migration from one to the other. Therefore, the embodiments of the present invention that are applicable to 4G networks also include implementations for IPv4 and implementations for IPv6, as with the EVDO networks.

Figure 8:
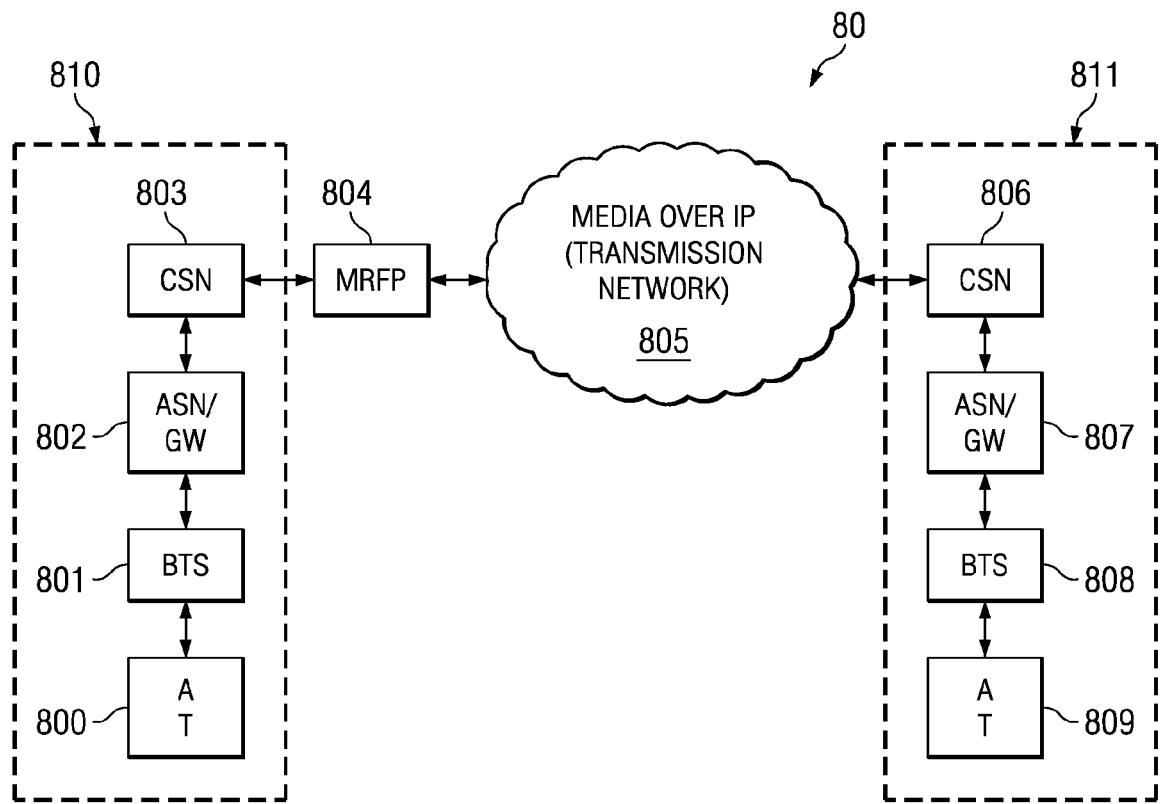
FIG. 8 is a block diagram illustrating a M2M VoIP communication session over a WiMax network configured according to one embodiment of the present invention.

FIG. 8 is a block diagram illustrating WiMax network 80 configured according to one embodiment of the present invention. FIG. 8 illustrates a M2M session over WiMax network 80. The main concepts are similar to the EVDO implementation with the largest difference being the network architecture. Similar to the EVDO implementation, BTS 801 obtains packet transmission time over the air-interface with AT 800 based on PHY/MAC layer information, using GPS time, UTC time, or the like. This would require additional IE or fields for the interface to transfer the information. BTS 801 then ultimately sends this timing information to the node that performs ROHC de-compression. In WiMax network 80, access service network (ASN)/gateway (GW) 802 or connectivity service node (CSN) 803 may perform ROHC de-compression. Thus, the VoIP packet is sent by BTS 801 to ASN/GW 802, which then sends the packet to CSN 803. If ROHC de-compression is performed at ASN/GW 802, ASN/GW 802 would then encode the time of origin into the IPv4 fragment offset field, such as fragment offset field 301 (FIG. 3). At terminating network 811, assuming ASN/GW 807 performs the ROHC compression, it would inspect the IPv4 header and retrieve the time of origin from the fragment offset field. The time of origin would then be passed on to the forward link MAC scheduler at BTS 808 whereby BTS 808 would compare the value of time of origin to the end-to-end delay bound for the VoIP packet. BTS 808's MAC scheduler would then schedule delivery of the VoIP packet to target AT 809 according to a delay constraint based on the time of origin information and the allowed end-to-end VoIP delay for M2M VoIP calls in WiMax.

FIG. 8 also may be used to describe the implementation of one embodiment of the present invention used in WiMax network 80. For originating network 810, BTS 801 provides the time of origin of a VoIP media packet from AT 800 via the R6 interface to the node that performs ROHC de-compression. Assuming for purposes of this example that ASN/GW 802 is the node responsible for ROHC de-compression, ASN/GW 802 generates the APP RTCP packet with the RTP sequence number and time of origin as the payload of the APP RTCP packet and sends it to terminating network 811 through CSN 803, MRFP 804, and transmission network 805.

For the terminating network, CSN 806 routes the VoIP packet to ASN/GW 807, which performs ROHC compression and terminates the APP RTCP packet. ASN/GW 807 obtains the RTP sequence number and time of origin value from APP RTCP packet and uses the time of origin value to associate with the VoIP packet based on the RTP sequence number. Terminating BTS 808 schedules the VoIP packet based on the time of origin information. For example, BTS 808 has an end-to-end delay bound for WiMax VoIP end-to-end delay. Therefore, it can derive the actual residual time for the BTS MAC scheduler to schedule the VoIP packet delivery to AT 809. The time of origin and end-to-end WiMax VoIP delay bound account for the air-interface delay of originating network 810, the originating WiMax access network delay, the core network delays, and the transmission network delay from originating network 810 to terminating network 811. Terminating network 811 may also use some additional information taking into account the jitter of the APP RTCP packets and history of delay distribution based on some filtering done at terminating network 811 since the APP RTCP packet is not sent for every VoIP media packet.

Figure 9:
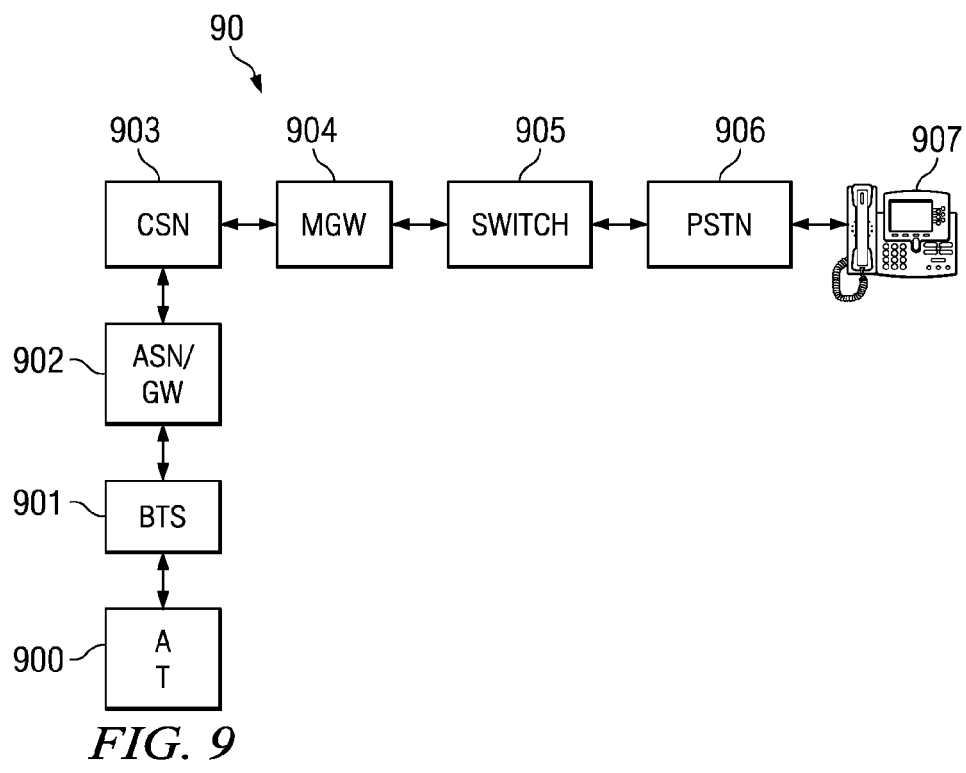
FIG. 9 is a block diagram illustrating a M2L/L2M VoIP communication session shown over a communication network configured according to one embodiment of the present invention.

FIG. 9 is a block diagram illustrating communication network 90 configured according to one embodiment of the present invention. FIG. 9 illustrates scenarios for M2L and L2M communications. Similar to the EVDO implementation, there are two optional methods for implementing the presently-described embodiment. In the first optional implementation for M2L VoIP calls, the ROHC de-compressor (assumed for purposes of this example at ASN/GW 902) will de-compress the compressed RTP/UDP/IP headers. Since the VoIP packet from AT 900 is to be routed to MGW 904 and switch 905 to inter-work with PSTN 906, the call-type information can be obtained from the IP address from the VoIP packet. This would also require the VoIP SIP session to be setup first. ASN/GW 902 provides feedback to the RRM and MAC layer at BTS 901. The RRM together with the MAC layer can then allocate resources corresponding to a less stringent delay requirement as compared to WiMax VoIP M2M calls due to smaller end-to-end delay for M2L calls. Like EVDO, this involves setting the H-ARQ or orthogonal frequency division multiple access (OFDMA) bandwidth allocations specific for WiMax VoIP M2L calls to allow for longer air-interface delay. In this case, the air-interface delay increase also increases the air-interface capacity while not causing significant voice quality degradation for M2L VoIP calls. This also helps increase reverse link air-interface capacity, whereby the actual percentage of capacity gain depends on the percentage of VoIP calls that are M2L in that sector.

In the second optional implementation, the SIP Proxy (e.g., P-CSCF in IMS) (not shown) provides feedback to ASN/GW 902 based on analyzing the SIP Invite message. ASN/GW 902 then provides this information to the RRM. The terminating party information in the SIP Invite Message (e.g., E.164 number) is used to indicate a PSTN terminating party, such as terminating party 907. The SIP Proxy (e.g., P-CSCF) provides information to ASN/GW 902 (referenced to a VoIP Mobile ID or suitable identifier) that this VoIP call will be routed to the PSTN. The feedback would be in the form of a proprietary message since there is no such standardized message. This mechanism is more complicated but would be faster for ASN/GW 802 to detect that the call-type is M2L since it is done during the VoIP SIP session setup procedure prior to the start of VoIP media packet transmission. Therefore, ASN/GW 902 can update the RRM earlier. This method is faster since the SIP session setup is to be completed before the VoIP media can be transmitted. Thus, the RRM will get this feedback first.

As with the EVDO implementations, the L2M call scenarios operate similarly to the M2L calls, except in reverse. As previously mentioned, when the call-type is known to be L2M, the forward link scheduler can allow a longer delay bound for scheduling VoIP packet delivery.

It should be noted that EVDO networks may also benefit from identification of call type. Variable fields, such as a profile IDs, may be provided that hold the identifier that indicates whether the call is M2M, M2L, or L2M. Core network messages may be changed to detect when to use mobile terminate VoIP profile IDs.

It should be noted that various additional and/or alternative embodiments of the present invention may suggest enhancements for VoIP applications based on the network architecture supporting air interface protocols, as shown n FIG. 8. Special or dedicated Connection IDs, Service Flow IDs or Logical IDs for the VoIP media flow are introduced to differentiate different call types (M2M, M2L, and L2M). The RRM module, through the use of the special identifiers (Connection IDs, Service Flow IDs or Logical IDs), can provide different bandwidth allocations and scheduling criteria based on the type of VoIP call. This process will also involve some core network and ASN/GW message/information exchange in order to detect when to use mobile-terminated VoIP IDs (Connection IDs, Service Flow IDs or Logical IDs).

It should be noted that while described in terms of EVDO and WiMax networks, the various embodiments of the present invention may also be applied to other wireless network configurations, such as 3GPP's high speed packet access (HSPA) architectures and System Architecture Evolution's (SAE) evolved packet system (EPS). The various embodiments apply in much the same way as applied in the EVDO and WiMax systems, with the network architecture being the greatest difference in implementation.

Figure 10:
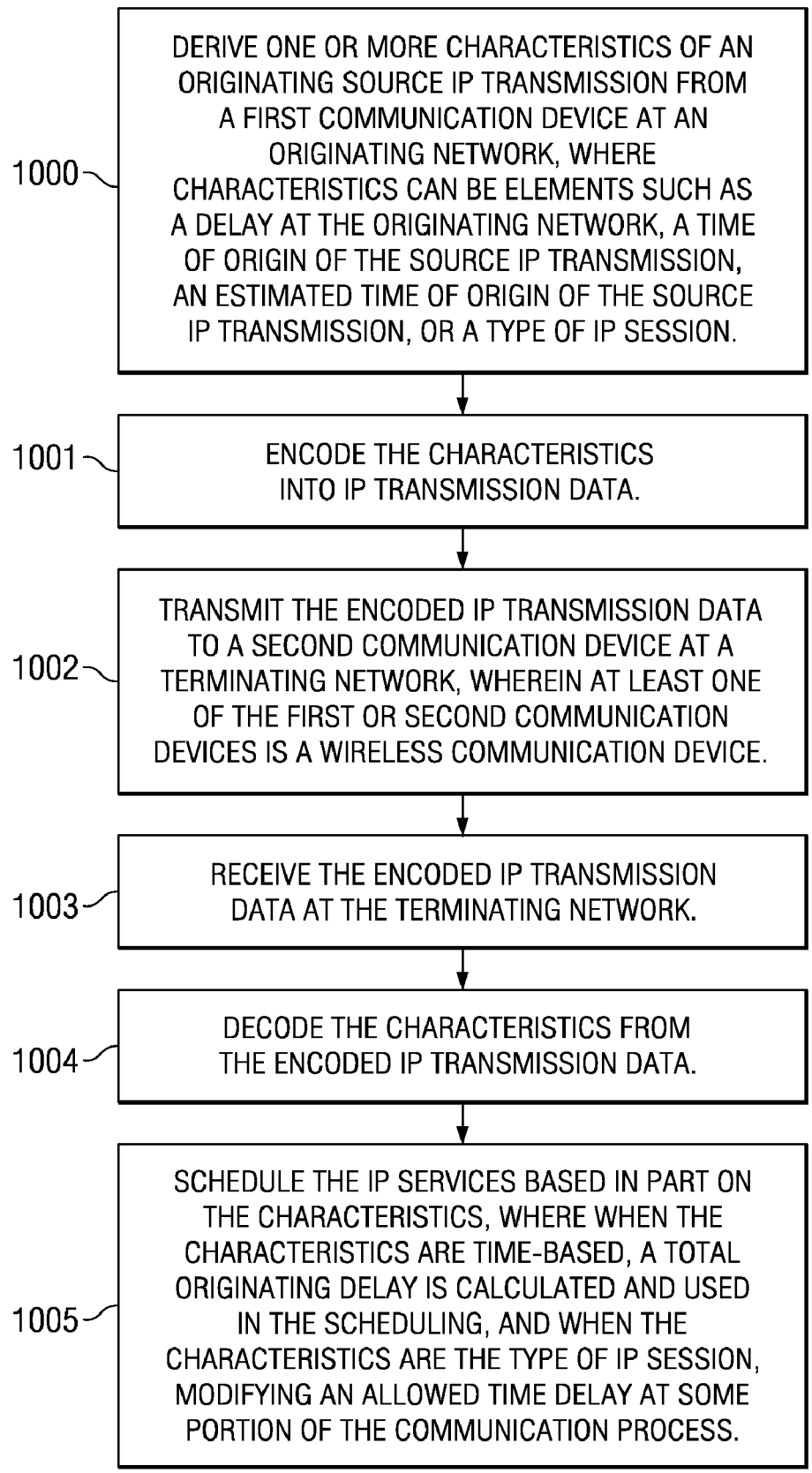
FIG. 10 is a flowchart illustrating example steps executed to implement one embodiment of the present invention.

FIG. 10 is a flowchart illustrating example steps executed to implement one embodiment of the present invention. In step 1000, one or more characteristics of an originating source VoIP transmission are derived from a first communication device at an originating network, where characteristics can be elements such as a delay at the originating network, a time of origin of the source VoIP transmission, an estimated time of origin of the source VoIP transmission. The characteristics are then encoded into VoIP transmission data in step 1001. The encoded VoIP transmission data is transmitted, in step 1002, to a second communication device at a terminating network, wherein at least one of the first or second communication devices is a wireless communication device. The encoded VoIP transmission data is received, in step 1003, at the terminating network. In step 1004, the characteristics are decoded from the encoded VoIP transmission data. The VoIP services are then scheduled, in step 1005, based in part on the characteristics, where when the characteristics are time-based, a total originating delay is calculated and used in the scheduling, and when the characteristics are the type of VoIP session, modifying an allowed time delay at some portion of the communication process.

The various illustrative logical blocks, modules, and circuits described in connection with the embodiment disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 11:
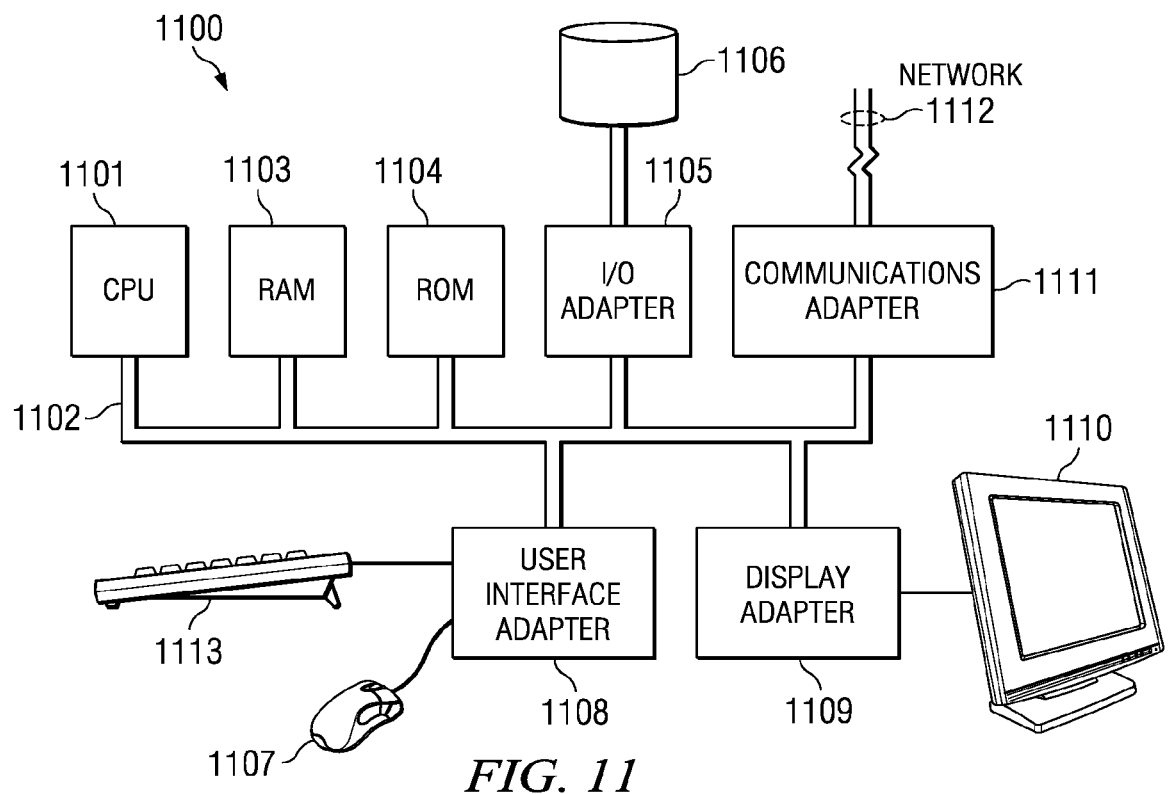
FIG. 11 is a block diagram illustrating a computer system adapted to use embodiments of the present invention

FIG. 11 illustrates computer system 1100 adapted to use embodiments of the present invention, e.g. storing and/or executing software associated with the embodiments. Central processing unit (CPU) 1001 is coupled to system bus 1102. The CPU 1101 may be any general purpose CPU. However, embodiments of the present invention are not restricted by the architecture of CPU 1101 as long as CPU 1101 supports the inventive operations as described herein. Bus 1102 is coupled to random access memory (RAM) 1103, which may be SRAM, DRAM, or SDRAM. ROM 1104 is also coupled to bus 1102, which may be PROM, EPROM, or EEPROM. RAM 1103 and ROM 1104 hold user and system data and programs as is well known in the art.

Bus 1102 is also coupled to input/output (I/O) controller card 1105, communications adapter card 1111, user interface card 1108, and display card 1109. The I/O adapter card 1105 connects storage devices 1106, such as one or more of a hard drive, a CD drive, a floppy disk drive, a tape drive, to computer system 1100. The I/O adapter 1105 is also connected to a printer (not shown), which would allow the system to print paper copies of information such as documents, photographs, articles, and the like. Note that the printer may be a printer (e.g., dot matrix, laser, and the like), a fax machine, scanner, or a copier machine.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for managing voice over internet protocol (VoIP) services comprising:
    deriving one or more characteristics of a source voice transmission from a first communication device in an originating network;
    formatting said source voice transmission into VoIP transmission data;
    adjusting one or more VoIP transmission parameters based on said one or more characteristics;
    encoding said one or more characteristics into said VoIP transmission data;
    transmitting said encoded VoIP transmission data to a terminating network;
    decoding said one or more characteristics from said encoded VoIP transmission data; and
    scheduling delivery of said source voice transmission to a second communication device based in part on said one or more characteristics, wherein at least one of said first and second communication devices is a wireless communication device.

2. The method of claim 1 wherein said one or more characteristics comprise one or more of:
    a delay at said originating network;
    a time of origin of said source voice transmission;
    an estimated time of origin of said source voice transmission; or
    a type of voice transmission.

3. The method of claim 2 further comprising:
    using one of said delay, said time of origin, or said estimated time of origin to calculate a delay time attributable to said originating network.

4. The method of claim 2 wherein said time of origin or said estimated time of origin are measured using a global synchronized clock, said method further comprising:
    measuring a total absolute delay of said source voice transmission from said time of origin or estimated time of origin using said global synchronized clock, wherein said scheduling uses said total absolute delay.

5. The method of claim 2 wherein said type of voice transmission comprises one of:
    a mobile to mobile call;
    a land to mobile call; or
    a mobile to land call.

6. The method of claim 5, wherein said type of voice transmission is said mobile to land call; and
    wherein said adjusting occurs at said originating network and comprises:
        updating one or more reverse link media access control (MAC) parameters to increase a delay interval for transmissions over an air interface between said first communication device and a base transceiver.

7. The method of claim 6 wherein said updating is determined based on one of
    a destination IP address corresponding to said terminating network comprising a public switched telephone network (PSTN); or
    a universal resource indicator (URI) field in a session initiation protocol (SIP) invite message corresponding to a PSTN communication device belonging to said terminating network comprising said PSTN.

8. The method of claim 6 wherein said updating comprises one or both of
    adjusting one or more hybrid automatic retransmission request (H-ARQ) terminating targets; or
    adjusting bandwidth allocation of said originating network.

9. The method of claim 6, wherein said type of voice transmission is said land to mobile call, said method further comprising:
    receiving a switched-based transmission at a multimedia gateway from said first communication device of said originating network;
    converting said switched-based transmission into said VoIP transmission data at said multimedia gateway; and
    wherein said deriving, said adjusting, said encoding, said decoding, and said scheduling occur at said terminating network.

10. The method of claim 2 wherein said one or more characteristics comprise said time of origin or said estimated time of origin determined using a global synchronized clock.

11. The method of claim 1 further comprising:
    calculating a delay time attributable to said originating network using said one or more characteristics; and
    comparing said delay time with a maximum delay allowed by a host communication system, wherein said scheduling is conducted in accordance with said comparing.

12. The method of claim 1 wherein said first and second communication devices comprise said wireless communication device, and wherein said encoding comprises:

encoding said one or more characteristics into a fragment offset field of an internet protocol, version 4 (IPv4) header.

13. The method of claim 1 wherein said first and second communication devices comprise said wireless communication device, and wherein said encoding comprises:
   encoding a realtime protocol (RTP) sequence number of said VoIP transmission data and said one or more characteristics into a realtime control protocol application (APP RTCP) packet.

14. The method of claim 1 wherein said deriving comprises:
   examining the physical (PHY) and media access control (MAC) layers of said VoIP packet to determine said one or more characteristics.

15. A communication system comprising:
   a first network node, said first originating network node comprising:
      a first processor;
      a detection component operable by said processor that examines one or more of a physical (PHY) layer or a media access control (MAC) layer of an IP packet for transmission characteristics, said IP packet received from an originating communication device; and
      a first interface that transmits said IP packet and said transmission characteristics to a second network node; and
   said second network node comprising:
      a second processor;
      an encoder operable by said processor that encodes said transmission characteristics into said IP packet; and
      an output interface that transmits the encoded IP packet onto a transmission network addressed to a terminating communication device, wherein at least one of said originating or terminating communication devices is a mobile communication device.

16. The communication system of claim 15 wherein said transmission characteristics comprise one of:
   a delay at said originating network;
   a time of origin of said source IP transmission;
   an estimated time of origin of said source IP transmission; or
   a type of IP voice transmission.

17. The communication system of claim 15 further comprising:
   a third network node comprising:
      a third processor;
      an input interface that receives said encoded IP packet; and
      a decoder operable by said third processor that extracts the transmission characteristics from said encoded IP packet; and
   a fourth network node comprising:
      a fourth processor; and
      a scheduler that uses the transmission characteristics to schedule delivery of said IP packet to said terminating communication device.

18. A computer program product having a non-transitory computer readable storage medium with an executable computer program stored thereon,
   wherein the program instructs a processor to perform the following steps: program product comprising:
   derive one or more characteristics of a source voice transmission from a first communication device in an originating network;
   format said source voice transmission into VoIP transmission data;
   code for adjusting adjust one or more VoIP transmission parameters based on said one or more characteristics;
   encode said one or more characteristics into said VoIP transmission data;
   transmit said encoded VoIP transmission data to a terminating network;
   decode said one or more characteristics from said encoded VoIP transmission data; and
   schedule delivery of said source voice transmission to a second communication device based in part on said one or more characteristics, wherein at least one of said first and second communication devices is a wireless communication device.

19. The computer program product of claim 18 wherein said one or more characteristics comprise one or more of:
   a delay at said originating network;
   a time of origin of said source voice transmission;
   an estimated time of origin of said source voice transmission; or
   a type of voice transmission.

20. The computer program product of claim 19 wherein said time of origin or said estimated time of origin are measured using a global synchronized clock, said method further comprising:
   code for measuring a total absolute delay of said source voice transmission from said time of origin or estimated time of origin using said global synchronized clock, wherein said code for scheduling uses said total absolute delay.

21. The computer program product of claim 19 wherein said type of voice transmission comprises one of:
   a mobile to mobile call;
   a land to mobile call; or
   a mobile to land call.

22. The computer program product of claim 21, wherein said type of voice transmission is said mobile to land call; and
   wherein said adjusting occurs at said originating network and comprises:
      code for updating one or more reverse link media access control (MAC) parameters to increase a delay interval for transmissions over an air interface between said first communication device and a base transceiver.

23. The computer program product of claim 22 wherein said code for updating is determined based on one of:
   a destination IP address corresponding to said terminating network comprising a public switched telephone network (PSTN); or
   a universal resource indicator (URI) field in a session initiation protocol (SIP) invite message corresponding to said terminating network comprising said PSTN.

24. The computer program product of claim 22, wherein said code for updating comprises one or both of:
   code for adjusting, one or more hybrid automatic retransmission request (H-ARQ) terminating targets; or
   code for adjusting bandwidth allocation of said originating network.

25. The computer program product of claim 21, wherein said type of voice transmission is said land to mobile call and wherein said code for deriving, said code for adjusting, said code for encoding, said code for decoding, and said code for scheduling are executed at said terminating network.

* * * * *

UNITED STATES PATENT AND TRADEMARK OFFICE
CERTIFICATE OF CORRECTION

| | |
|---|---|
| PATENT NO. | : 7,940,655 B2 |
| APPLICATION NO. | : 11/931692 |
| DATED | : May 10, 2011 |
| INVENTOR(S) | : Gopal |

It is certified that error appears in the above-identified patent and that said Letters Patent is hereby corrected as shown below:

In Col. 17, line 62, claim 18, delete "program product comprising".
In Col. 18, line 3, claim 18, delete "code for adjusting".
In Col. 18, line 55, claim 24, delete the "," after "adjusting".

Signed and Sealed this
Twelfth Day of July, 2011

David J. Kappos
*Director of the United States Patent and Trademark Office*